(12) United States Patent
Nguyen et al.

(10) Patent No.: US 10,031,039 B2
(45) Date of Patent: Jul. 24, 2018

(54) COMPENSATED PRESSURE SENSORS

(71) Applicant: DUNAN SENSING, LLC, San Jose, CA (US)

(72) Inventors: Tom T. Nguyen, San Jose, CA (US); Cuong D. Nguyen, San Jose, CA (US)

(73) Assignee: DUNAN SENSING LLC, San Jose, CA (US)

( * ) Notice: Subject to any disclaimer, the term of this patent is extended or adjusted under 35 U.S.C. 154(b) by 0 days.

(21) Appl. No.: 15/434,019

(22) Filed: Feb. 15, 2017

(65) Prior Publication Data

US 2017/0160155 A1    Jun. 8, 2017

Related U.S. Application Data

(63) Continuation of application No. 14/516,462, filed on Oct. 16, 2014, now Pat. No. 9,593,994.

(51) Int. Cl.
*G01L 9/02* (2006.01)
*G01L 13/02* (2006.01)
*G01L 9/04* (2006.01)

(52) U.S. Cl.
CPC ............ *G01L 13/025* (2013.01); *G01L 9/045* (2013.01)

(58) Field of Classification Search
CPC .............................. G01L 9/065; G01L 13/025
See application file for complete search history.

(56) References Cited

U.S. PATENT DOCUMENTS

| 4,565,097 | A  | 1/1986 | Dimeff |
| 6,023,978 | A  | 2/2000 | Dauenhauer et al. |
| 6,581,468 | B2 | 6/2003 | Clifford |
| 8,466,523 | B2 | 6/2013 | Chiou |

*Primary Examiner* — Ryan Walsh
(74) *Attorney, Agent, or Firm* — Hackler Daghighian Martino & Novak

(57) ABSTRACT

Compensated pressure sensor includes a MEMS pressure sensor die having resistors RA and RD connected in series in a first leg of a Wheatstone bridge and resistors RB and RC connected in series in a second leg of the Wheatstone bridge; a first and second fuse; and a first, second, third, fourth, fifth and sixth resistor; wherein: a first end of the first resistor is connected in series with the first leg of the bridge and a first end of the second resistor is connected in series with the second leg of the bridge; the first fuse is connected, at a first end, to a first output of the bridge, and at a second end, to a second end of the third resistor and to a first end of the second fuse; the second fuse is connected, at a second end, to a second output of the bridge; a first end of the third resistor is connected to an input to the bridge and to a first end of the fourth resistor; a second end of the fourth resistor is connected to a second end of the first resistor, a second end of the second resistor and a first end of the sixth resistor; and the fifth resistor is connected, at a first end, to the input to the bridge.

19 Claims, 4 Drawing Sheets

COMPENSATED PRESSURE SENSORS

CROSS-REFERENCE TO RELATED APPLICATION

This application is a continuation of co-pending U.S. patent application Ser. No. 14/516,462, filed on Oct. 16, 2014, which is hereby incorporated by reference in its entirety.

TECHNICAL FIELD

One or more embodiments relate to compensated pressure sensors and, in particular, to compensated differential pressure sensors, and, more particularly, to a differential pressure transducer using two temperature compensated pressure sensors with output coupling and signal conditioning for high performance.

BACKGROUND

There are a variety of sensing devices on the market that are capable of providing an indication of stimuli. Many incorporate electrical elements that are subjected to some form of manipulation caused by the physical quantity being sensed, thereby causing a change in their electrical characteristics. One example of such sensing devices is a MEMS ("Micro-Electro-Mechanical Systems") pressure sensor. A typical such MEMS pressure sensor includes a small, thin silicon chip or diaphragm onto which a number of resistances that function as strain gauges (for example, piezoresistors) are formed by well-known processes in a Wheatstone bridge. In operation, stresses caused by pressure applied to the chip or diaphragm change the resistance values of the piezoresistors in the Wheatstone bridge (the applied pressure causes the chip or diaphragm to deflect, which deflection creates compressive and tensile forces in the resistances thereby causing a change in their electrical values). An electronic circuit detects the changes in resistance values, and outputs an electrical signal representative of the applied pressure.

Differential pressure sensors are used to measure pressure differences between two pressure sources. It is known to use separate Wheatstone bridge arrangements of interconnected resistances as pressure sensors for measuring each of the two pressure sources. Ideally, in order to provide an accurate differential pressure measurement, the output voltage versus pressure characteristics for each of the bridge pressure sensors should be similar and should remain similar despite factors such as changing temperature.

The above described pressure sensors are sensitive to various disturbances, such as temperature changes, which, if uncompensated, will cause errors in the pressure reading. Temperature induced errors may be observed, for example, as a change in the output of the sensor as temperature varies with zero pressure applied, and as a change in the difference between the full-scale output and the zero pressure output as the temperature varies with full-scale pressure applied.

SUMMARY

One or more embodiments provide improved compensated pressure sensors. Further, an improved compensated differential pressure sensor is formed by a pair of pressure sensors of similar construction in such a manner as to compensate for unwanted effects in the sensors such as effects due to temperature. In particular, one or more such embodiments relate to compensated differential pressure sensor devices that include MEMS ("Micro-Electro-Mechanical Systems") pressure sensors. In accordance with one or more such embodiments, two compensated MEMS pressure sensors are combined so that effects from the two sensors would be in opposition to one another. As a result, if they were both subjected to variations of the same polarity, their respective signals would cancel each other, and thus, no output signal would result. If, for example, each of the pair of sensors was subjected to temperature, they would drift in the same way (since they are adjusted to have the same general characteristics) so that one temperature signal would cancel the other temperature signal. In other words, unwanted effects due, for example, to temperature of one sensor compensates for the effects of the other sensor, and a signal is obtained that is more purely responsive to the pressure stimuli.

Specifically, in accordance with one embodiment, a compensated pressure sensor comprises: a MEMS pressure sensor die having resistors RA and RD connected in series in a first leg of a Wheatstone bridge and resistors RB and RC connected in series in a second leg of the Wheatstone bridge; a first and second fuse; and a first, a second, a third, a fourth, a fifth and a sixth resistor; wherein: a first end of the first resistor is connected in series with the first leg of the bridge and a first end of the second resistor is connected in series with the second leg of the bridge; the first fuse is connected, at a first end, to a first output of the bridge, and at a second end, to a second end of the third resistor and to a first end of the second fuse; the second fuse is connected, at a second end, to a second output of the bridge; a first end of the third resistor is connected to an input to the bridge and to a first end of the fourth resistor; a second end of the fourth resistor is connected to a second end of the first resistor, a second end of the second resistor and a first end of the sixth resistor; and the fifth resistor is connected, at a first end, to the input to the bridge.

DETAILED DESCRIPTION

Figure 1:
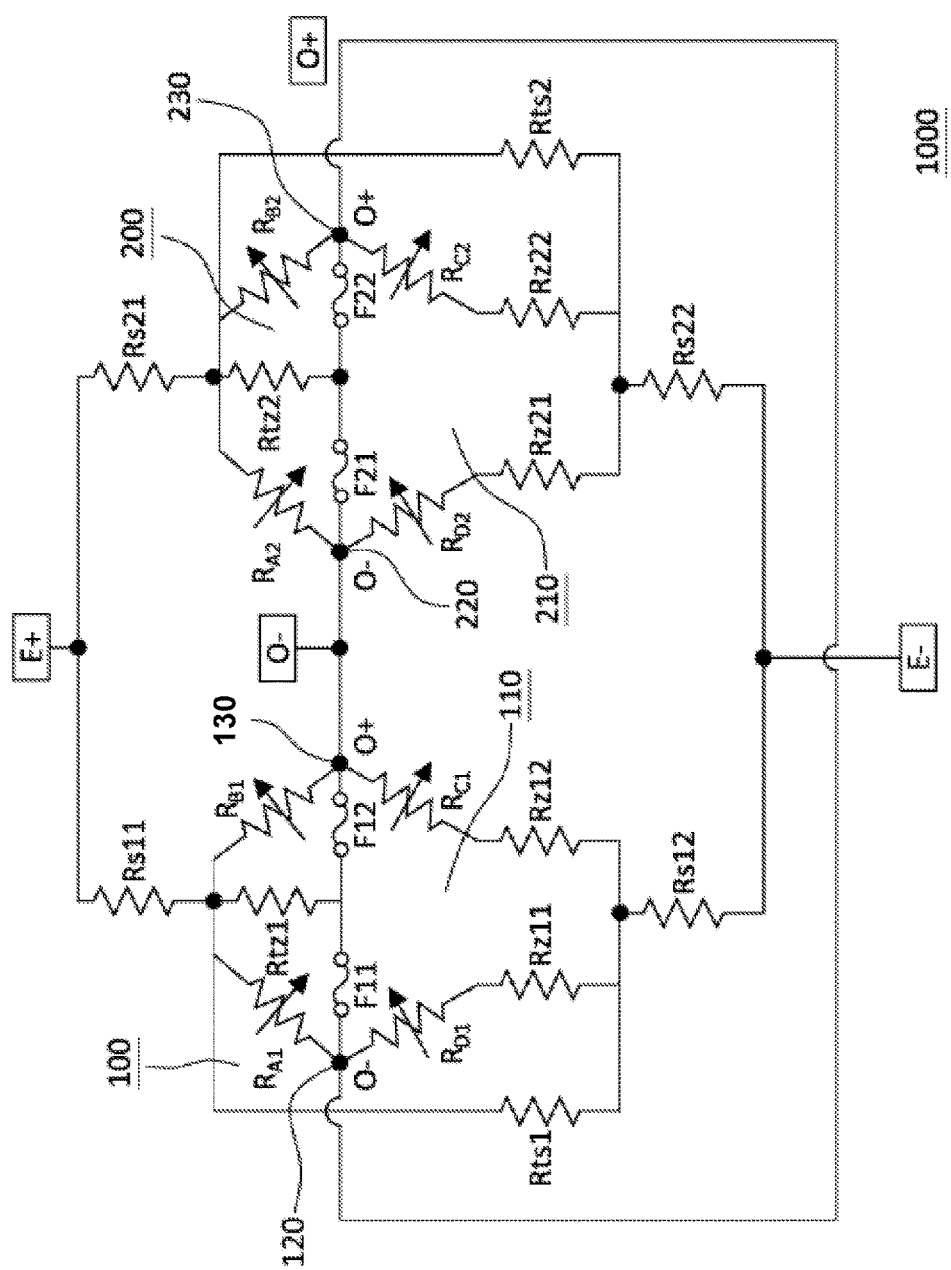
FIG. 1 is a schematic circuit diagram of a compensated differential pressure sensor that is fabricated in accordance with one or more embodiments.

Embodiments will be described with reference to the figures, wherein like components, parts, and so forth are designated by like reference numerals throughout the various figures. Further, specific parameters such as pressure values, materials, size, dimensions, shapes, and the like are provided herein, and are intended to be explanatory rather than limiting.

One or more embodiments are directed to a differential pressure sensor that comprises two compensated MEMS ("Micro-Electro-Mechanical Systems") pressure sensors, each being in the form of a MEMS sensor die having a Wheatstone bridge which is compensated, as described below, to eliminate unwanted effects when measuring pressure such as, for example and without limitation, temperature sensitivity. MEMS pressure sensor dies used to fabricate embodiments are well known to those of ordinary skill in the art and may readily be obtained commercially from any one of a number of companies such as, among others, companies having readily accessible websites on the Internet. Note that, the compensated differential pressure sensors described herein are not limited to the use of MEMS pressure sensor dies.

FIG. 1 is a schematic circuit diagram of compensated differential pressure sensor 1000 that is fabricated in accordance with one or more embodiments, which compensated differential pressure sensor 1000 is typically used to sense and measure the differential pressure of fluids or liquids. As shown in FIG. 1, compensated differential pressure sensor 1000 includes compensated MEMS pressure sensor 100 that is cross-coupled, and in parallel, to compensated MEMS pressure sensor 200.

In accordance with one or more embodiments, compensated MEMS sensor 100 shown in FIG. 1 comprises a MEMS sensor die that includes Wheatstone bridge 110 and compensated MEMS sensor 200 shown in FIG. 1 comprises a MEMS sensor die that includes Wheatstone bridge 210. As shown in FIG. 1, the positive output of a power supply (not shown in FIG. 1), for example, a voltage supply, is applied to a first end of resistor $R_{s11}$ and a first end of resistor $R_{s21}$, respectively. As further shown in FIG. 1, a second end of resistor $R_{s11}$ is connected to Wheatstone bridge 110 of compensated MEMS sensor 100, to a first end of resistor $R_{ts1}$, and to a first end of resistor $R_{tz1}$. Wheatstone bridge 110 comprises resistors $R_{A1}$, $R_{B1}$, $R_{C1}$ and $R_{D1}$, hence, the second end of resistor $R_{s11}$ is connected to a first end of resistor $R_{A1}$, to a first end of resistor $R_{B1}$, to a first end of resistor $R_{ts1}$, and to a first end of resistor $R_{tz1}$. As further shown in FIG. 1, a second end of resistor $R_{s21}$ is connected to Wheatstone bridge 210 of compensated MEMS sensor 200, to a first end of resistor $R_{ts2}$, and to a first end of resistor $R_{tz2}$. Wheatstone bridge 210 comprises resistors $R_{A2}$, $R_{B2}$, $R_{C2}$ and $R_{D2}$, hence, the second end of resistor $R_{s21}$ is connected to a first end of resistor $R_{A2}$, to a first end of resistor $R_{B2}$, to a first end of resistor $R_{ts2}$, and to a first end of resistor $R_{tz2}$.

Resistive elements $R_{A1}$, $R_{B1}$, $R_{C1}$ and $R_{D1}$ of Wheatstone bridge 110 are formed on a planar substrate (not shown) and mounted in a support mechanism that allows the substrate to be subjected to pressure to be measured. The pressure causes the substrate to deform, thereby inducing compressive and tensile forces in the resistive elements, and effecting a change in their electrical characteristics. Typically, placement of resistive elements $R_{A1}$ and $R_{C1}$ on the substrate is such that their response to the pressure is in a similar fashion to each other, while resistive elements $R_{B1}$ and $R_{D1}$ are placed to respond similarly to the pressure, but in an opposite sense to that of resistances $R_{A1}$ and $R_{C1}$. The placement of the resistances for Wheatstone bridge 210 is the same as that for Wheatstone bridge 110.

As shown in FIG. 1, a second end of $R_{D1}$ of Wheatstone bridge 110 is connected to a first end of resistor $R_{z11}$, and a second end of resistor $R_{C1}$ of Wheatstone bridge 110 is connected to a first end of resistor $R_{z12}$. As further shown in FIG. 1, a second end of resistor $R_{ts1}$ is connected to a second end of resistor $R_{z11}$, a second end of resistor $R_{z12}$, and a first end of resistor $R_{s12}$. As further shown in FIG. 1, (a) a first end of fuse $F_{11}$ is connected to a second end of resistor $R_{A1}$ of Wheatstone bridge 110 and to a first end of resistor $R_{D1}$ of Wheatstone bridge 110; (b) a second end of fuse $F_{11}$ is connected to a second end of resistor $R_{tz1}$ and to a second end of fuse $F_{12}$; and (c) a first end of fuse $F_{12}$ is connected to a second end of resistor $R_{B1}$ of Wheatstone bridge 110 and to a first end of resistor $R_{C1}$ of Wheatstone bridge 110.

As shown in FIG. 1, a second end of $R_{c2}$ of Wheatstone bridge 210 is connected to a first end of resistor $R_{z22}$ and a second end of resistor $R_{D2}$ of Wheatstone bridge 210 is connected to a first end of resistor $R_{z21}$. As further shown in FIG. 1, a second end of resistor $R_{ts2}$ is connected to a second end of resistor $R_{z21}$, a second end of resistor $R_{z22}$, and a first end of resistor $R_{s22}$. As further shown in FIG. 1, (a) a first end of fuse $F_{21}$ is connected to a second end of resistor $R_{A2}$ of Wheatstone bridge 210 and to a first end of resistor $R_{D2}$ of Wheatstone bridge 210; (b) a second end of fuse $F_{21}$ is connected to a second end of resistor $R_{tz2}$ and to a second end of fuse $F_{22}$; and (c) a first end of fuse $F_{22}$ is connected to a second end of resistor $R_{B2}$ of Wheatstone bridge 210, to a first end of resistor $R_{c2}$ of Wheatstone bridge 210, and to a first end of fuse $F_{11}$.

As further shown in FIG. 1, a second end of resistor $R_{s12}$ is connected to a second end of resistor $R_{s22}$, and to a negative output of the power supply.

Lastly, compensated MEMS sensor 100 and compensated MEMS sensor 200 are cross-coupled. This is accomplished, for the polarities of voltages shown in FIG. 1, by connecting: (a) negative terminal 120 of compensated MEMS sensor 100 to positive terminal 230 of compensated MEMS sensor 200; and (b) positive terminal 130 of compensated MEMS sensor 100 to negative terminal 220 of compensated MEMS sensor 200. In accordance with one or more embodiments, output from differential pressure sensor 1000 is taken from positive terminal 230 of compensated MEMS sensor 200 and positive terminal 130 of compensated MEMS sensor 100.

Since the output nodes of Wheatstone bridges 110 and 210 are cross-coupled so that the outputs subtract from each other, and since Wheatstone bridges 110 and 210 will respond to thermal variations so that these errors will tend to cancel each other, the output will be the differential pressure substantially free of these errors.

In accordance with one or more embodiments, resistors $R_{z11}$, $R_{z12}$, $R_{s11}$, $R_{s12}$, $R_{tz1}$, and $R_{ts1}$ are used to provide compensation for compensated MEMS sensor 100 as follows (resistors $R_{z11}$, $R_{z12}$, $R_{s11}$, $R_{s12}$, $R_{tz1}$, and $R_{ts1}$ are typically external to Wheatstone bridges 110 and 210) (i.e., this provides a compensated pressure sensor).

"Type 1" Compensation for Compensated MEMS Sensor 110: "Type 1" compensation refers to the following: (a) to provide compensation for compensated MEMS sensor 100 to bring the output voltage at zero pressure desirably close to zero (for example and without limitation, within about +/−0.25 mV or +/−0.1 mV); and (b) to provide compensation for compensated MEMS sensor 100 if the output voltage at zero pressure, over a range of temperatures (typically, this range goes from a cold temperature such as, for example, −25° C., includes room temperature, i.e., about 20° C., and ends at a hot temperature such as 85° C.) is not equal, or suitably close, to zero (for example and without limitation, within about +/−0.25 mV or +/−0.1 mV)—ideally the output from compensated MEMS sensor 100 should be the same or suitably close to being the same over the range of temperatures. Resistors $R_{tz1}$, $R_{z11}$ and $R_{z12}$ are used to provide Type 1 compensation, and the values of $R_{tz1}$, $R_{z11}$ and $R_{z12}$ are determined by considering two cases. Case 1 is used when the voltage output of compensated MEMS sensor 100 at zero pressure is negative at room temperature, i.e., in the middle of the range. For case 1, fuse $F_{12}$ is cut. Case two is used when the voltage output of compensated MEMS sensor 100 at zero pressure is positive at room temperature, i.e., in the middle of the range. For case 2, fuse $F_{11}$ is cut.

For Case 1:

$$R_{tz1}=(D*B-H*F)/(H*F/E-D*B/A-G+C) \quad (1)$$

$$R_{z11}=R_{z12}=(A*C/B)-D \quad (2)$$

For Case Two:

$$R_{tz1}=-b\pm(\text{SQRT}(b^2-4*a*c)/2*a \text{ (the positive value)} \quad (3)$$

$$R_{z11}=R_{z12}=(B*D/A)-C \quad (4)$$

where:

$$a=E*(B*D-A*C)-A*(F*H-E*G) \quad (5)$$

$$b=F*E*(BD-AC+AG)-AB(C*E+F*H-E*G) \quad (6)$$

$$c=A*B*E*F*(G-C) \quad (7)$$

where: A is $R_{A1}$ (as measured at zero pressure at the coldest temperature in the temperature range), B is $R_{B1}$ (as measured at zero pressure at the coldest temperature in the temperature range), C is $R_{C1}$ (as measured at zero pressure at the coldest temperature in the temperature range), D is $R_{D1}$ (as measured at zero pressure at the coldest temperature in the temperature range), E is $R_{A1}$ (as measured at zero pressure at the hottest temperature in the temperature range), F is $R_{B1}$ (as measured at zero pressure at the hottest temperature in the temperature range), G is $R_{C1}$ (as measured at zero pressure at the hottest temperature in the temperature range), and H is $R_{D1}$ (as measured at zero pressure at the hottest temperature in the temperature range).

"Type 2" Compensation for Compensated MEMS Sensor 110: "Type 2" compensation refers to the following: (a) to provide compensation for compensated MEMS sensor 100 to bring the FSO voltage, i.e., the "full scale output" voltage at FSO ("full scale output") pressure desirably close to a predetermined value, $V_{pred}$ (for example and without limitation, within about +/−1% of $V_{pred}$) (where $V_{pred}$ is the predetermined FSO voltage at FSO pressure at a middle temperature of the temperature range (for example, and without limitation, room temperature); and (b) to provide compensation for compensated MEMS sensor 100 if the output voltage at the FSO pressure over a range of temperatures (typically, this range goes from a cold temperature such as, for example, −25° C., includes room temperature, i.e., about 20° C., and ends at a hot temperature such as 85° C.) is not equal, or suitably close, to a predetermined value (for example and without limitation, within about +/−1% of the predetermined FSO voltage—ideally the output from compensated MEMS sensor 100 should be the same or suitably close to being the same over the range of temperatures. $R_{s11}$, $R_{s12}$, and $R_{ts1}$ are used to provide Type 2 compensation, and the values of $R_{s11}$, $R_{s12}$, and $R_{ts1}$ are determined as follows.

Define S (the "span") as the change in output voltage from zero pressure to FSO pressure.

$$R_{ts1}=(R_{brg-h}*S_c-R_{brg-c}*S_h)/(S_h-S_c) \quad (8)$$

where: (a) $R_{brg-c}$ is the resistance of bridge 110 (i.e., the resistance of the combination of resistors $R_{A1}$, $R_{B1}$, $R_{C1}$, $R_{D1}$, $R_{z11}$ and $R_{z12}$; as measured at the full scale output pressure at the coldest temperature in the temperature range (e.g., −25° C.)); (b) $R_{brg-h}$ is the resistance of bridge 110 (i.e., the resistance of the combination of resistors $R_{A1}$, $R_{B1}$, $R_{C1}$, $R_{D1}$, $R_{z11}$ and $R_{z12}$; as measured at the full scale output pressure at the hottest temperature in the temperature range (e.g., 85° C.)); (c) $S_c$ is the span of MEMS sensor 100 as measured at the coldest temperature in the temperature range (e.g., −25° C.); and (d) $S_h$ is the span of compensated MEMS sensor 100 as measured at the hottest temperature in the temperature range (e.g., 85° C.).

$$R_s=(R_b*V_{fso})/(V_{fso}-V_{pred})-R_b \quad (9)$$

where: (a) $R_s$ is the sum of $R_{s11}$ and $R_{s12}$ ($R_{s11}$ and $R_{s12}$ should be equally divided in value to adjust the bridge resistance symmetrically, i.e., $R_{s11}=R_{s12}$)—in other words, resistors $R_{s11}$ and $R_{s12}$ could be replaced by a single resistor and $R_s$ placed in the position of resistor $R_{s11}$; (b) $V_{fso}$ equals the FSO voltage at FSO pressure at a middle temperature of the temperature range (for example, and without limitation, room temperature); and (c) $R_b$ is the resistance of bridge 110 as measured at full scale output pressure at a middle temperature of the temperature range (for example, and without limitation, $R_b$ is the resistance of the combination of resistors $R_{A1}$, $R_{B1}$, $R_{C1}$, $R_{D1}$, $R_{z11}$ and $R_{z12}$ as measured at full scale output pressure at room temperature).

In accordance with one or more embodiments, resistors $R_{z21}$, $R_{z22}$, $R_{s21}$, $R_{s22}$, $R_{tz2}$, and $R_{ts2}$ are used to provide compensation for compensated MEMS sensor 200 in the same manner in which resistors $R_{z11}$, $R_{z12}$, $R_{s11}$, $R_{s12}$, $R_{tz1}$, and $R_{ts1}$ are used to provide compensation for compensated MEMS sensor 100 (as described above).

Figure 2:
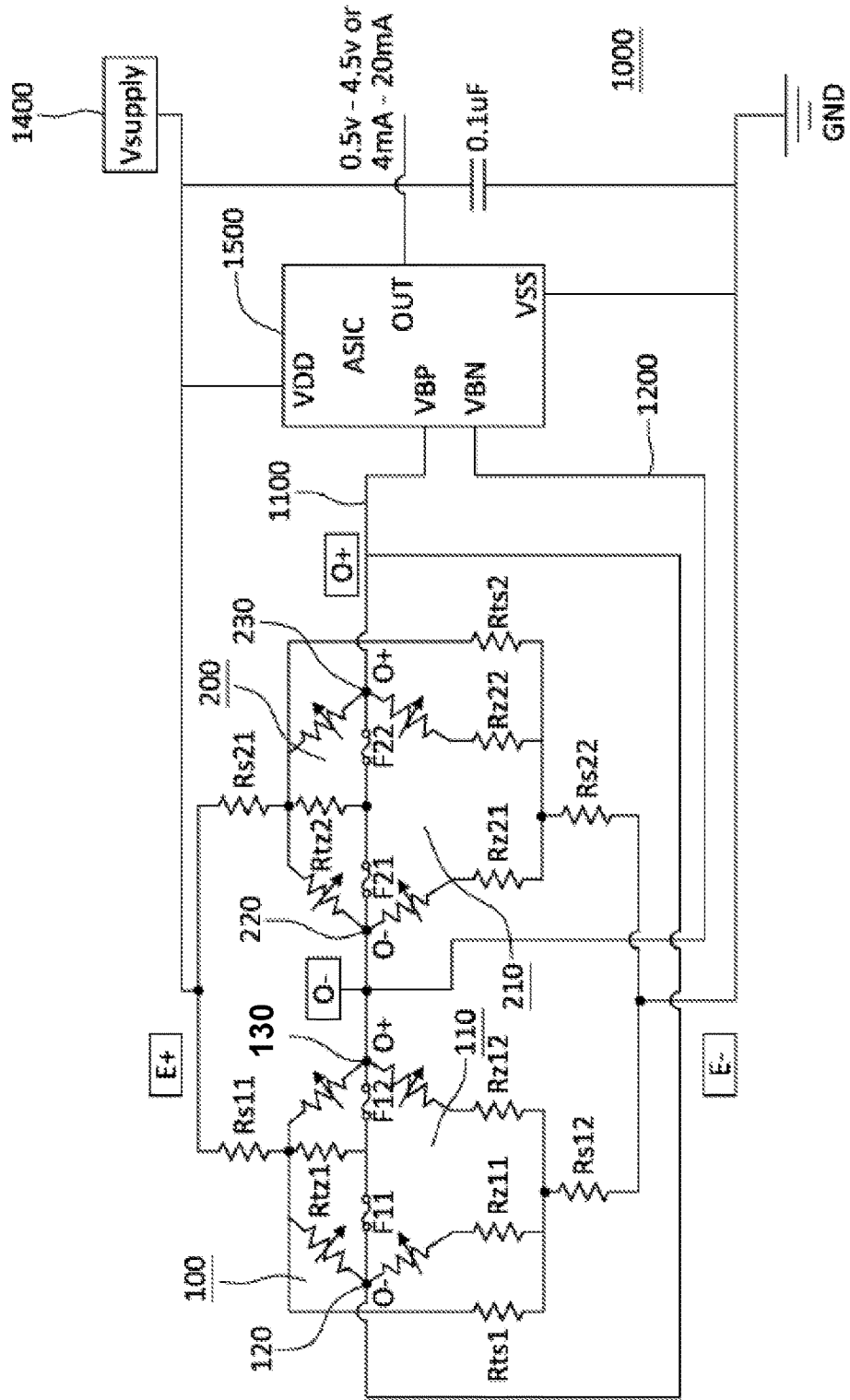
FIG. 2 shows the schematic circuit diagram of the compensated differential pressure sensor shown in FIG. 1 with the addition of an ASIC ("Application-Specific Integrated Circuit") for compensation and amplification of output from the compensated differential pressure sensor shown in FIG. 1.

FIG. 2 shows the schematic circuit diagram of differential pressure sensor 1000 shown in FIG. 1 with the addition of ASIC 1500 ("Application-Specific Integrated Circuit") for compensation and amplification of the output signal from differential pressure sensor 1000. For example, ASIC 1500 will compensate for sensor errors, using its internal circuitry and algorithms, so that there will be a second order compensation (i.e., compensation in addition to that described above) that is useful when there are tight specifications on the output signal from differential pressure sensor 1000. Such compensation will correct the voltage output from differential pressure sensor 1000: (a) if the voltage output at zero pressure differs from zero, ASIC 1500 will change the value to be closer to zero; (b) if the FSO voltage at FSO pressure differs from a predetermined value, ASIC 1500 will change the value to be closer to the predetermined value; (c) if the voltage output at zero pressure over the temperature range is not the same, ASIC 1500 will correct the voltage outputs to make them closer to each other over the range; and (d) if the FSO voltage output at FSO pressure over the temperature range is not the same, ASIC 1500 will correct the voltage outputs to make them closer to each other over the range. In addition, ASIC 1500 will amplify and customize the output signal from differential pressure sensor 1000 to meet a customer's specification as to voltage output or to current output (for example, so that the voltage output is in a range from about 0.5V to about 4.5V or in a range from about 0.5V to about 3.5V or so that the current output is in a range from about 4 mA to about 20 mA). Such ASICs are well known to those of ordinary skill in the art, and as such, a suitable ASIC may readily be obtained from any one of a number of companies such as, among others, companies having readily accessible websites on the Internet. The manner in which to operate ASIC 1500 to accomplish the compensation, amplification and customization of the output signal from differential pressure sensor 1000 is provided by the manufacturers' specifications. As shown in FIG. 2, voltage supply 1400 is applied to differential pressure sensor 1000 in such a fashion that the negative terminal is ground.

As further shown in FIG. 2, the positive output from voltage supply 1400 is connected to terminal $V_{DD}$ of ASIC 1500, the ground terminal from voltage supply 1400 is connected to terminal $V_{SS}$ of ASIC 1500 to have a common ground, the positive output from differential pressure sensor 1000 is connected to terminal $V_{BP}$, and the negative output from differential pressure sensor 1000 is connected to terminal $V_{BN}$. Lastly, a capacitor is connected across the positive output of voltage supply 1400 and ground. In accordance with one or more embodiments, the output from ASIC 1500 is in a range from about 0.5 v to about 4.5 v or in a range from about 4 mA to about 20 mA over a pressure differential, for example and without limitation, from about 0 to about 100 PSI.

One skilled in the art will appreciate that although particular polarities of the power supply and output signal are illustrated in FIGS. 1 and 2, differential pressure sensor 1000 would function in the same manner if all of the polarities were reversed.

As one of ordinary skill in the art would readily appreciate, a differential pressure may be measured using differential pressure sensor 1000 when one of a first and a second pressures is an applied pressure from a first pressure source and the second of the first and second pressures is a different applied pressure from a second pressure source. Further, as one of ordinary skill in the art would readily appreciate, an absolute pressure may be measured when one of the first and second pressures is an applied pressure from a pressure source that is to be measured and the second of the first and second pressures is a vacuum or a reference pressure such as, for example and without limitation, atmospheric pressure. Still further, as one of ordinary skill in the art would readily appreciate, differential pressure sensor 1000 may be used to measure the pressure of various media such as fluids, including gases and liquids. For example and without limitation, the medium may be air, a refrigerant, or oil.

In operation of differential pressure transducer 1000, when both dies are compensated properly, and are coupled together, the differential pressure transducer is virtually error free. The differential pressure transducer measures the difference in pressure between pressure P1 (which may be any pressure, for example and without limitation) impinging on the first side of compensated MEMS sensor 100 and on the second side of compensated MEMS sensor 200 and pressure P2 (which may be any pressure, for example and without limitation) impinging on the second side of compensated MEMS sensor 100 and on the first side of compensated MEMS sensor 200. The resulting output is the difference between pressures P1 and P2.

Figure 3:
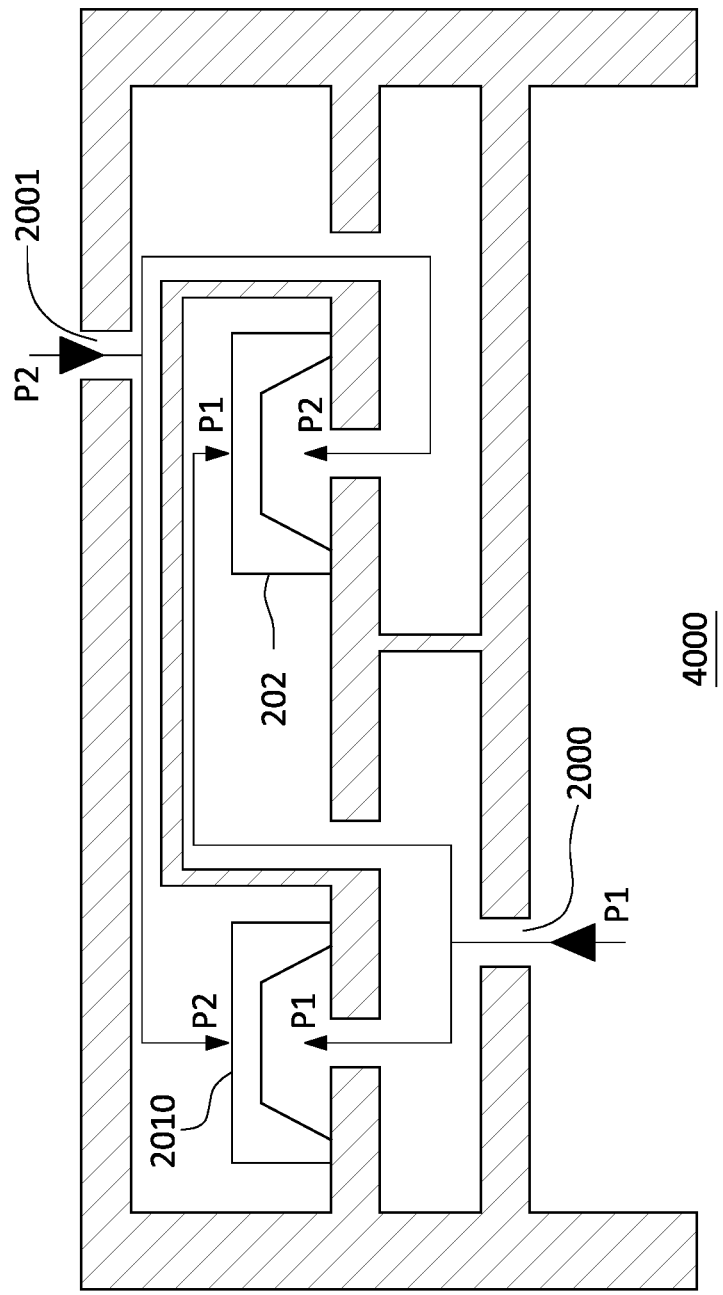
FIG. 3 shows a cross section of a differential pressure package where pressure ports are on different sides of the package.

FIG. 3 shows a cross section of differential pressure package 4000 where pressure ports 2000 and 2001 are on different sides of package 4000. As seen in FIG. 3, pressure sources P1 and P2 are applied as input to ports 2000 and 2001, respectively, where ports 2000 and 2001 are disposed on opposite sides of package 4000. As further seen in FIG. 3, pressure P1 is applied to the back and the front of sensors 2010 and 2020, respectively, and pressure P2 is applied to the front and the back of sensors 2010 and 2020, respectively.

Figure 4:
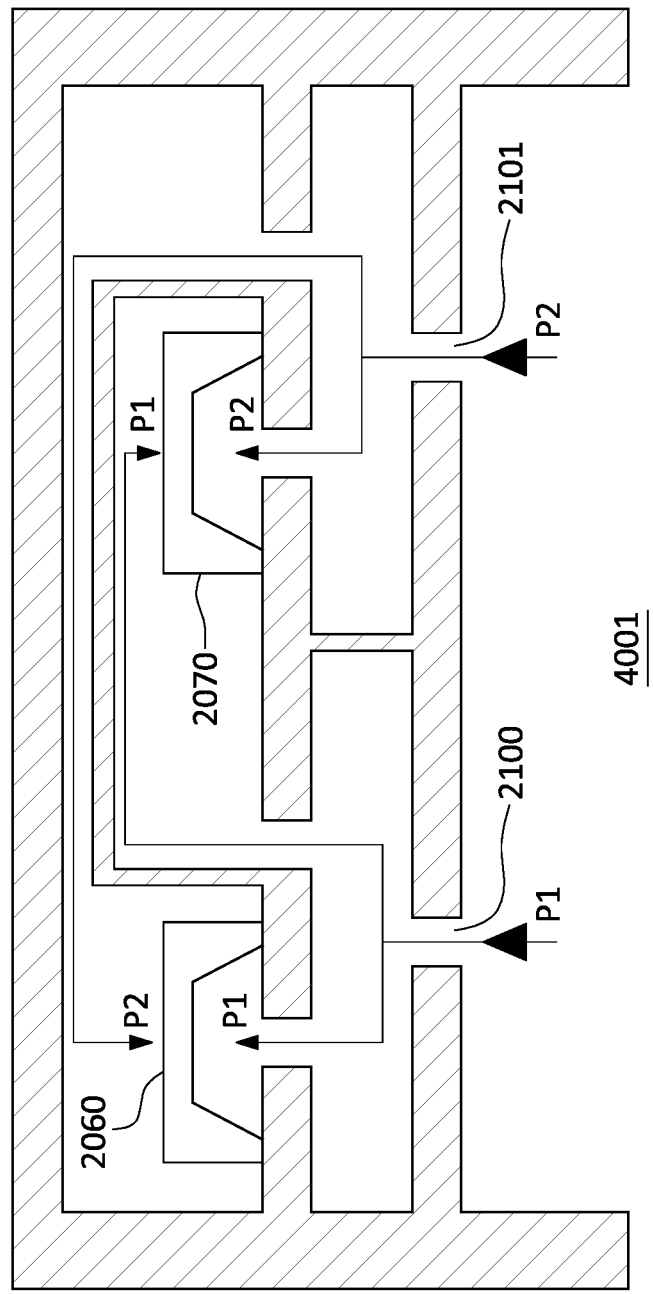
FIG. 4 shows a cross section of a differential pressure package where pressure ports are on the same side of the package.

FIG. 4 shows a cross section of differential pressure package 4001 where pressure ports 2100 and 2101 are on the same side of package 4001. As seen in FIG. 4, pressure sources P1 and P2 are applied as input to ports 2100 and 2101, respectively, where ports 2100 and 2101 are disposed on the same side of package 4001. As further seen in FIG. 4, pressure P1 is applied to back and front of sensors 2060 and 2070, respectively, and pressure P2 is applied to front and back of sensors 2060 and 2070, respectively.

Embodiments described above are exemplary. For example, numerous specific details are set forth such as parts, dimensions, temperature ranges, materials, mechanical design, etc. to provide a thorough understanding of the present invention. However, as one having ordinary skill in the art would recognize, the present invention can be practiced without resorting to the details specifically set forth. As such, many changes and modifications may be made to the description set forth above by those of ordinary skill in the art (i.e., various refinements and substitutions of the various embodiments are possible based on the principles and teachings herein) while remaining within the scope of the invention. In addition, materials, methods, and mechanisms suitable for fabricating embodiments have been described above by providing specific, non-limiting examples and/or by relying on the knowledge of one of ordinary skill in the art. Materials, methods, and mechanisms suitable for fabricating various embodiments or portions of various embodiments described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

What is claimed is:

1. A differential pressure sensing assembly comprising:
    an electrical circuit including a positive power supply, a first wheatstone bridge and a second wheatstone bridge;
    a first pressure sensor including a plurality of strain gauges RA1, RB1, RC1 and RD1 wherein RA1 and RD1 are electrically connected in series to form a first leg and RB1 and RC1 are electrically connected in series to form a second leg and the first leg and second leg are connected in parallel to form the first wheatstone bridge;
    a first fuse and a second fuse electrically connected in series wherein a first end of the first fuse is connected between strain gauges RA1 and RD1 on the first leg and the second end of the second fuse is electrically connected between strain gauges RB1 and RC1 on the second leg,
    a second pressure sensor including a second plurality of strain gauges RA2, RB2, RC2 and RD2 wherein RA2 and RD2 are electrically connected in series to form a third leg and RB2 and RC2 are electrically connected in series to form a fourth leg and the third leg and fourth leg are connected in parallel to form the second wheatstone bridge;
    a third and a fourth fuse electrically connected in series wherein a first end of the third fuse is connected between strain gauges RA2 and RD2 on the third leg and the second end of the fourth fuse is electrically connected between strain gauges RB2 and RC2 on the fourth leg;
    wherein positive power from the positive power supply enters the first wheatstone bridge between RA1 and RB1 and enters the second wheatstone bridge between RA2 and RB2 and
    wherein a first node between RB1 and RC1 is electrically connected to a second node between RA2 and RD2 and wherein a third node between RA1 and RD1 is electrically connect to a fourth node between RB2 and RC2.

2. The differential pressure sensing assembly of claim 1, wherein the second pressure sensor has the same construction as the first pressure sensor.

3. The differential pressure sensing assembly of claim 2, wherein the first and second pressure sensors are MEMS devices.

4. The differential pressure sensing assembly of claim 3, wherein the first plurality of strain gauges and the second plurality of strain gauges electrically measure the deflection of a diaphragm formed in a silicon wafer.

5. The differential pressure sensing assembly of claim 2 further comprising a housing with a first port and a second port on opposite sides of the housing wherein the first pressure sensor and the second pressure sensor are coupled to the housing such that a back of the first pressure sensor is exposed to a first pressure from the first port and a front of the first pressure sensor is exposed to a second pressure from the second port and a back of the second pressure sensor is exposed to the second pressure from the second port and a front of the second pressure sensor is exposed to the first pressure from the first port.

6. The differential pressure sensing assembly of claim 2 further comprising a housing with a first port and a second port on a same side of the housing wherein the first pressure sensor and the second pressure sensor are coupled to the housing such that a back of the first pressure sensor is exposed to a first pressure from the first port and a front of the first pressure sensor is exposed to a second pressure from the second port and a back of the second pressure sensor is exposed to the second pressure from the second port and a front of the second pressure sensor is exposed to the first pressure from the first port.

7. A method of measuring differential pressure comprising:
   forming an electrical circuit including a positive power supply, a first wheatstone bridge and a second wheatstone bridge;
   forming a first pressure sensor including a plurality of strain gauges RA1, RB1, RC1 and RD1 wherein RA1 and RD1 are electrically connected in series to form a first leg and RB1 and RC1 are electrically connected in series to form a second leg and the first leg and second leg are connected in parallel to form the first wheatstone bridge;
   electrically connecting a first fuse and a second fuse in series wherein a first end of the first fuse is connected between strain gauges RA1 and RD1 on the first leg and the second end of the second fuse is electrically connected between strain gauges RB1 and RC1 on the second leg;
   forming a second pressure sensor including a second plurality of strain gauges RA2, RB2, RC2 and RD2 wherein RA2 and RD2 are electrically connected in series to form a third leg and RB2 and RC2 are electrically connected in series to form a fourth leg and the third leg and fourth leg are connected in parallel to form the second wheatstone bridge;
   electrically connecting a third fuse and a fourth fuse in series wherein a first end of the third fuse is connected between strain gauges RA2 and RD2 on the third leg and the second end of the fourth fuse is electrically connected between strain gauges RB2 and RC2 on the fourth leg;
   applying a positive power from the positive power supply to the first wheastone bridge between RA1 and RB1 and the second wheatstone bridge between RA2 and RB2;
   electrically connecting a first node between RB1 and RC1 to a second node between RA2 and RD2;
   electrically connecting a third node between RA1 and RD1 to a fourth node between RB2 and RC2; and
   measuring an electrical output of the first node and the fourth node to determine a differential pressure.

8. The method of measuring differential pressure of claim 7, wherein the second pressure sensor has the same construction as the first pressure sensor.

9. The method of measuring differential pressure of claim 8, wherein the first and second pressure sensors are MEMS devices.

10. The method of measuring differential pressure claim 9, wherein the first plurality of strain gauges and the second plurality of strain gauges measure the deflection of a diaphragm formed in a silicon wafer.

11. The method of measuring a differential pressure of claim 8, further comprising coupling the first pressure sensor and the second pressure sensor to a housing with a first port and a second port on opposite sides of the housing wherein the first pressure sensor and the second pressure sensor are coupled to the housing such that a back of the first pressure sensor is exposed to a first pressure from the first port and a front of the first pressure sensor is exposed to a second pressure from the second port and a back of the second pressure sensor is exposed to the second pressure from the second port and a front of the second pressure sensor is exposed to the first pressure from the first port.

12. The method of measuring a differential pressure of claim 8, further comprising coupling the first pressure sensor and the second pressure sensor to a housing with a first port and a second port on opposite sides of the housing wherein the first pressure sensor and the second pressure sensor are coupled to the housing such that a back of the first pressure sensor is exposed to a first pressure from the first port and a front of the first pressure sensor is exposed to a second pressure from the second port and a back of the second pressure sensor is exposed to the second pressure from the second port and a front of the second pressure sensor is exposed to the first pressure from the first port.

13. A differential pressure sensing assembly comprising:
   an electrical circuit including a positive power supply, a first wheatstone bridge and a second wheatstone bridge;
   a first pressure sensor including a plurality of strain gauges RA1, RB1, RC1 and RD1 wherein RA1 and RD1 are electrically connected in series to form a first leg and RB1 and RC1 are electrically connected in series to form a second leg and the first leg and second leg are connected in parallel to form the first wheatstone bridge;
   a first fuse and a second fuse electrically connected in series wherein a first end of the first fuse is connected between strain gauges RA1 and RD1 on the first leg and the second end of the second fuse is electrically connected between strain gauges RB1 and RC1 on the second leg;
   a second pressure sensor including a second plurality of strain gauges RA2, RB2, RC2 and RD2 wherein RA2 and RD2 are electrically connected in series to form a third leg and RB2 and RC2 are electrically connected in series to form a fourth leg and the third leg and fourth leg are connected in parallel to form the second wheatstone bridge; and
   a third fuse and a fourth fuse electrically connected in series wherein a first end of the third fuse is connected between strain gauges RA2 and RD2 on the third leg and the second end of the fourth fuse is electrically connected between strain gauges RB2 and RC2 on the fourth leg;

wherein the first wheastone bridge is cross coupled to the second wheatstone bridge by directly connecting a first node between RB1 and RC1 to a second node between RA2 and RD2 and directly connecting a third node between RA1 and RD1 to a fourth node between RB2 and RC2.

14. The differential pressure sensing assembly of claim 13 wherein an electrical output of the differential pressure sensing assembly is measured from the first node and the fourth node.

15. The differential pressure sensing assembly of claim 13, wherein the second pressure sensor has the identical construction as the first pressure sensor.

16. The differential pressure sensing assembly of claim 15, wherein the first and second pressure sensors are MEMS devices.

17. The differential pressure sensing assembly of claim 16, wherein the first plurality of strain gauges and the second plurality of strain gauges electrically measure the deflection of a diaphragm formed in a silicon wafer.

18. The differential pressure sensing assembly of claim 15 further comprising a housing with a first port and a second port on opposite sides of the housing wherein the first pressure sensor and the second pressure sensor are coupled to the housing such that a back of the first pressure sensor is exposed to a first pressure from the first port and a front of the first pressure sensor is exposed to a second pressure from the second port and a back of the second pressure sensor is exposed to the second pressure from the second port and a front of the second pressure sensor is exposed to the first pressure from the first port.

19. The differential pressure sensing assembly of claim 15 further comprising a housing with a first port and a second port on a same side of the housing wherein the first pressure sensor and the second pressure sensor are coupled to the housing such that a back of the first pressure sensor is exposed to a first pressure from the first port and a front of the first pressure sensor is exposed to a second pressure from the second port and a back of the second pressure sensor is exposed to the second pressure from the second port and a front of the second pressure sensor is exposed to the first pressure from the first port.

* * * * *